UNITED STATES PATENT OFFICE.

ARCHIBALD K. LEE, OF PHILADELPHIA, PENNSYLVANIA, ASSIGNOR OF ONE-HALF TO WASHINGTON HORTER, OF SAME PLACE.

ASPHALTUM PAINT.

SPECIFICATION forming part of Letters Patent No. 235,365, dated December 14, 1880.

Application filed May 17, 1880. (Specimens.)

*To all whom it may concern:*

Be it known that I, ARCHIBALD K. LEE, of the city and county of Philadelphia, and State of Pennsylvania, have invented a new and useful Asphaltum Paint in Colors, which is fully described in the following specification.

The object of my invention is to produce a cheap, tough, elastic, and durable paint; and it consists in a paint, whether plain or in colors, in which natural asphaltum is the base.

Heretofore natural asphaltum has been known only as a coating in the shape of a varnish, and in the manipulations to produce said varnish no chemical action has taken place to change its color, and even as a varnish the color has invariably been substantially that in which the asphaltum is found in nature—viz., a dark brown.

Egyptian mummies preserved in asphaltum have been reduced to a powder by manufacturers in France for the use of artists, producing a brown color; but in all cases the asphaltum has been used as a pigment only.

The formula I have adopted I have found produces the best results, and it is as follows: fifty pounds of the sal-soda of commerce, or any other equivalent alkali, combined with twenty pounds of fresh-slaked lime, thirty pounds of common salt, and seventy-six pounds of yellow ocher.

The above ingredients are heated to a boiling-point, and to which I add two hundred pounds of fluid asphaltum and ten gallons of linseed-oil. The whole mass is then thoroughly mixed until a complete chemical union is obtained, when the paint is ready to be put up in packages for use or used at once.

I prefer, but do not confine myself to the use of, asphaltum which has been reduced or made fluid by the process described in my patent of March 20, 1877, No. 188,646, for the reason that asphaltum which has been reduced or made fluid by heat is to a certain extent carbonized and made brittle. This makes it less tenacious and renders it unfit for a paint.

Any suitable and desirable pigment may be used instead of the ocher, or in addition to it, to vary the color of the paint; and this I consider the important feature of my invention, the chemical effect of the alkali, lime, and salt on the asphaltum being such that it will readily admit of change of color with suitable pigments.

Whiting may be used in place of the ocher, as either will produce a neutral tint, which can subsequently be changed to any preferred shade by the addition of suitable pigments, as indicated above. I prefer to use linseed-oil; but any other vegetable oil may be substituted therefor.

This paint is well adapted for all purposes to which paints of lead, zinc, &c., are applied, especially so when the surface or surfaces are exposed to the action of the elements. It being water-proof and thoroughly antiseptic, it is therefore a preserver of wood and anti-corrosive in the protection of metallic surfaces. In addition to the above qualities, it resists the action of acids and alkalies, and can be produced at about one-half the cost of paints made from lead or zinc.

Having thus fully described my invention, what I claim, and desire to secure by Letters Patent, is—

1. The herein-described process of converting natural asphaltum into a base for paints, consisting of first preparing an alkaline solution and rendering it caustic with lime, and adding common salt thereto, then raising the solution to the boiling-point and adding the natural asphaltum and linseed or other vegetable oil thereto, and also ocher or whiting, thus forming a neutral base for paints, to which any pigment may be added, according to the color desired, substantially as set forth.

2. A compound for paint consisting of natural asphaltum, linseed-oil, sal-soda, slaked lime, common salt, and ocher or other suitable pigment, in the proportions substantially as set forth.

ARCHIBALD K. LEE.

Witnesses:
GEO. M. LOCKWOOD,
J. O. EVANS.